Figure 1:
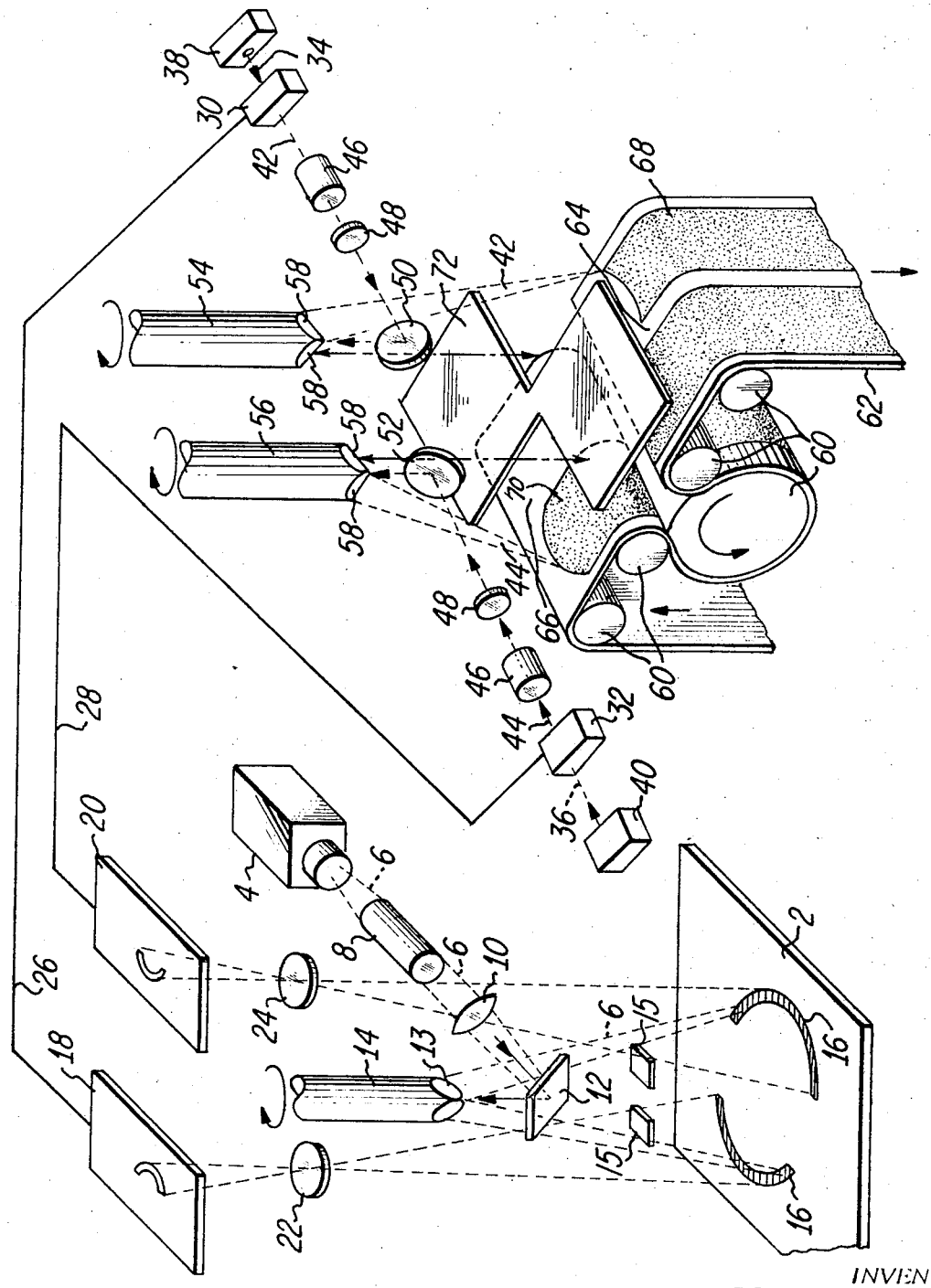

United States

Levene

[54] LIGHT BEAM SCANNING
[72] Inventor: Martin Lewis Levene, Cherry Hill, N.J.
[73] Assignee: RCA Corporation
[22] Filed: Oct. 14, 1970
[21] Appl. No.: 80,571

[52] U.S. Cl.................346/108, 178/6.7 R, 178/7.6, 350/7
[51] Int. Cl..............................................H04n 1/00
[58] Field of Search........346/108; 350/6, 7; 178/7.6, 178/6.7 R, 6 R; 250/236, 230

[56] References Cited
UNITED STATES PATENTS 1,834,330  12/1931  Brower..................................178/7.6

[11] 3,707,723
[45] Dec. 26, 1972

2,971,695  2/1961  Sick....................................250/230 X
3,064,077  11/1962  Cary....................................178/7.6 X
3,072,798  1/1963  Sick.......................................250/230
3,316,348  4/1967  Hufnagel et al. .....................178/6.7

Primary Examiner—Joseph W. Hartary
Attorney—Edward J. Norton

[57] ABSTRACT

There is described an arrangement for illuminating a rotatable planar reflector so as to produce a conically swept light beam whose intersection with a substantially planar or spherical surface provides an arcuate illuminated scan locus.

3 Claims, 6 Drawing Figures

INVENTOR
Martin L. Levene
BY
James B. Hayes
ATTORNEY

INVENTOR.
Martin L. Levene
BY
James B. Hayes
ATTORNEY

INVENTOR.
Martin L. Levene
BY
*James B. Hayes*
ATTORNEY

LIGHT BEAM SCANNING

This invention relates to light beam scanning techniques which are useful in, but not limited to, surveillance and/or recording systems, and more particularly to a system for providing a conical or arcuate scan in a substantially flat or spherical field. That is, a ray drawn from the scanner to the field scanned generates a conical surface.

Present standard approaches of such light beam scan systems utilize one of the forms of transverse scanning geometries. In transverse scanning, the scanning beam is swept in a plane which is normal to both the plane of the field scanned and the direction of preferably parallel relative motion between the scanner and the field.

Transverse scanning suffers from the inherent problem, that the distance traversed by the light beam between the scanner and the point on the locus scanned in the field plane is not constant, but rather a function of the transverse scan angle. This changing distance produces an undesirable variation in the spot size of the light beam along the locus in the scanned field. It has been found that transverse scanning a planar field utilizing even small transverse scanning angles, such as 5°, causes information distortion and blur.

The conical or arcuate scanning of the present invention results in substantially constant distance traversed by the light beam between the scanner and all points on the scanning locus in the field. Therefore for each given cone angle the light beam spot size is constant and independent of the scan angle through which the light beam is swept. Where conical or arcuate scanning is utilized, for example, in a transmitter for aerial surveillance of the ground, the constant range to all points of a given locus scanned on the ground results in small, constant angular and ground resolutions.

In a recorder-reproducer system, the conical scanning arrangement with a planar record medium enables transducing information without the use of a curved film or record medium platen and its associated curved film transport which are presently utilized in the art. This eliminates the problems associated with the flat-to-curved-to-flat shaping of the recording medium. The record medium transport can thus be made more compact, because the unsupported film span associated with the flat-to-curved-to-flat transition is not required.

In addition control of the record medium is enhanced, since the driving capstan may be located very close to the region where active recording is accomplished. Further with the arcuate or conical scan arrangement the data rate is a constant value. In addition, the conical arrangement inherently can provide dual scanning for such applications as fore/aft viewing and/or duplicate transducing.

Briefly in accordance with the invention there is provided an optical scanning apparatus for scanning a given surface from a location separated from the given surface. The apparatus includes a planar reflecting means which is rotatable about an axis which forms a given angle with the plane of the reflecting means. The axis of rotation is substantially normal to the given surface. The rotatable reflecting means is responsive to the illumination thereof by a light beam having a predetermined orientation with respect to the rotation axis to scan the given surface with a reflected light beam, the scan having a conical shape when the reflecting means is rotated.

In the drawing:

FIG. 1 is a diagrammatic view of a light scanning system embodying the present invention.

Figure 2A:
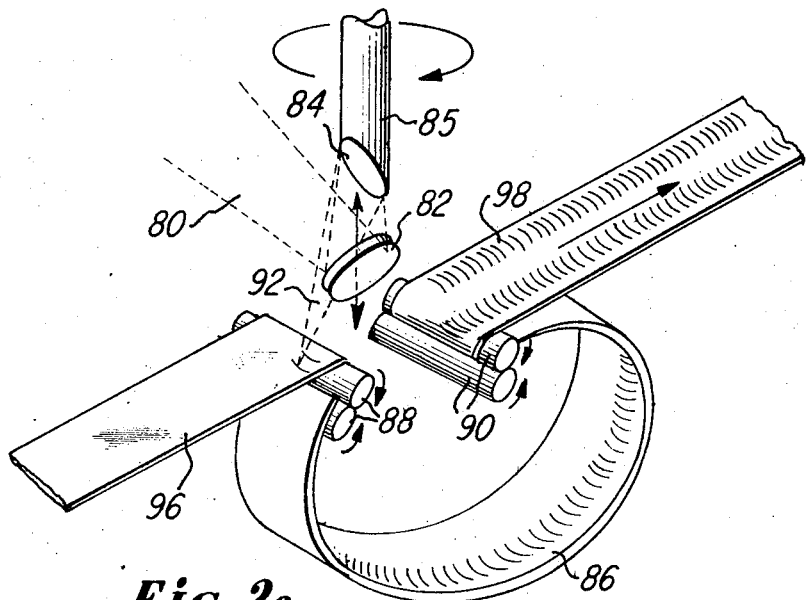

FIG. 2a and b are respective views of another embodiment of a portion of the system of FIG. 1.

Figure 3:
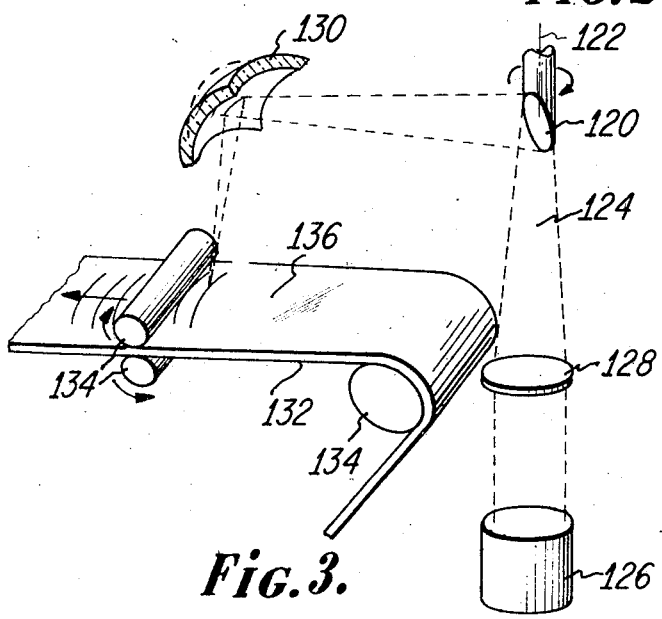

FIG. 3 is a perspective view of a further embodiment of a light beam scanning arrangement according to the invention.

Figure 4A:
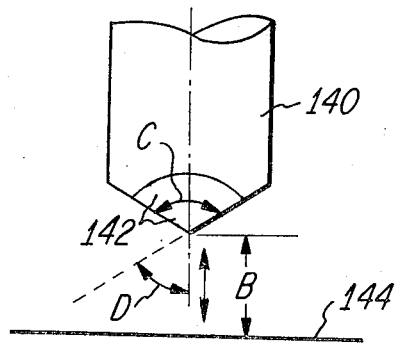
Figure 4B:
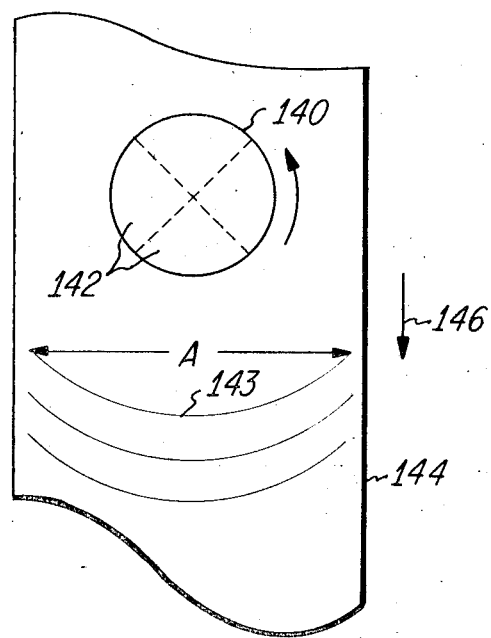

FIG. 4a and b are a plan and end views of a cooperative arrangement of a scanner and record medium according to the invention.

For purposes of discussing the present invention it will be understood that the term light includes not only the visible radiation spectrum but also infra-red and ultra-violet radiation spectra.

Throughout the discussion it is to be noted, that a light source referred to may be a known type of (either coherent or non-coherent) high intensity source such as a Xenon arc lamp or a laser light source. The laser light source is preferable, since its high power density permits scanning operation at extremely high rates, and sharper focus is possible due to the monochromatic spatially coherent light. For example suitable laser light sources are Argon (4,880 angstroms), Helium-Neon (6,328 angstroms), and $Nd^{3+}$:YAG (10,600 angstroms).

It will also be understood that the term cone angle as used is meant, as hereinafter defined, to refer to the space geometry of a scanned light beam and not to a cone of convergence produced by focusing a light beam.

In FIG. 1 there is shown a light beam system for scanning, recovering and recording information contained in a surface of interest. In practice for example, the arrangement may be an airborne system for obtaining and recording information about the earth surface below an airborne vehicle. For moderate altitudes the local earth, as an information surface, is substantially planar. At distant altitudes however, the sphericity of the earth becomes significant.

Conical scanning about an axis normal to the surface of interest produces an arcuate locus of intersection with either a planar or spherical surface. As will become more apparent from the subsequent discussion and understanding of the disclosed arrangement, the invention is applicable at differing heights above the surface of interest.

For present purposes of discussion and simplicity of understanding, the information bearing surface is shown as substantially a planar surface 2. In FIG. 1, a light source 4, preferably a laser light source, provides a light beam 6 through known collimating means 8 and focusing means 10 such as a lens system. The light beam 6 is reflected from a stationary planar reflector or mirror 12, to planar reflective surfaces 13 of a rotating member 14. For example as shown, the member 14 may be a multi-faced pyramidal reflector. However a single faced planar reflector may also be used. The axis of rotation of the reflective surfaces 13 of the rotating mirror 14 is arranged substantially normal or perpendicular to the information plane 2. The stationary reflector 12 is arranged to cause the light beam 6 from the focusing means 10 to be directed such that the central ray of beam 6 is directed to the rotating reflector surfaces 13 substantially parallel and preferably coaxially with the axis of rotation of the surfaces 13. Stated another way, the image produced by focusing means 10 and redirected by reflector 12 should preferably lie on the axis of rotation of the rotating mirror 14, where its distance from the reflector surfaces 13 is constant. The focus of the beam 6 will then swing in a circular arc 16 that lies in a plane which is normal to the axis of mirror 14, the circular arc being centered about the axis of mirror 14. It is to be noted that, it is possible to illuminate the reflectors 13 in a manner such that the image is not exactly on the axis of rotation. The central ray may be directed non-coaxial and even non-parallel to their axis of rotation. This will produce distortions such as non-circularity of the resultant scan and fluctuation in sharpness of focus which however may be acceptable for a given application.

More particularly, where either a single or multifaced rotating reflector is used with a focused illuminating beam, the preferable arrangement is that in which the image is projected toward the rotating reflector so as to lie on the axis of rotation of the rotating reflector, with the central ray substantially coaxial with the axis of rotation. This produces a right circular cone from the reflector which provides a circular arcuate scan on the surface scanned. Where the central ray of the illuminating beam is parallel to but non-coaxial with the axis of rotation, a cone is produced which is other than a right circular cone. Where the central ray of the illuminating beam is non-parallel to the rotation axis, in this arrangement; if the focal point is on the axis of rotation, then a right circular cone is produced but there may be intensity variation across the reflected beam; and if the focal point is other than on the rotation axis, the resultant arcuate scan will be distorted from a circular arc, and may not be in focus throughout the arcuate path 16 of the surface 2. Where a non-focused collimated illuminating beam is utilized; for a single faced rotating reflector and illumination coaxial or parallel to the rotation axis, the preferable right circular cone is produced, whereas illumination non-parallel to the axis of rotation produces a cone which does not result in circular arc scans; for a multifaced rotating reflector with central illuminating ray coaxial with the rotation axis, the preferable right circular cone and circular arc scan are produced, whereas for illumination with rays parallel to the rotation axis but with non-coaxial central ray the right circular cone is produced but with intensity variation across the reflected beam.

By way of example, a typical rotation speed for the scanning members is 81,000 RPM although speeds about 120,000 RPM and well below 15,000 RPM are suitable for the arrangement. The angle of the reflective surfaces 13 with respect to the axis of rotation of the member 14, is arranged to cause the light beam 6 to be directed so that it intercepts the surface 2. Conceptually the angle between the surfaces 13 and the rotation axis may be greater than 45° but less than 90°. However in practice suitable angles generally have been found to be in the range 60°-70°. For the arrangement just described, the light beam 6 is thus swept or scanned in a conical manner, whose intercept with the surface 2 produces, as shown in FIG. 1, an arcuate trace or locus 16 in which all points are substantially equidistant from the rotation axis of the scanning reflector 13.

It will be understood that suitable masking or light interrupting means 15 may be arranged, as discussed hereinafter for the recorder portion of the present system, to provide selected arc scan portions on the surface 2 as shown in FIG. 1. It will also be understood that the focal length of the focusing means 10 is suitably chosen for the total path traversed by the light beam 6 from the means 10 via the reflectors 12 and 13 to the surface 2.

Light returning from the scanned locus 16 on the surface 2 is focused on suitable light detector means 18 and 20 by focusing means 22 and 24 respectively. The returning light from the illuminated scanned portions 16, which has been optically modulated by the surface information, is transduced by the detectors 18 and 20 into corresponding modulated electrical signals on leads 26 and 28 respectively. The signals on leads 26 and 28 are fed to control optical modulators of known type 30 and 32 respectively. In response to the signals on leads 26 and 28, the modulators 30 and 32 modulate separate light beams 34 and 36 from light sources 38 and 40 respectively. Again preferably the light sources 38 and 40 are laser light beam sources. It will also be understood that while separate sources are shown for the light beams 6, 34 and 36, all light beams could be provided from a common source. Each of the light beam outputs 42 and 44 of the respective modulators are directed, through suitable collimating means 46 and focusing means 48, to respective stationary planar reflectors or mirrors 50 and 52. Each of the reflectors 50 and 52 is arranged to redirect its respective light beam to a planar reflective surface of rotating reflectors means 54 and 56 respectively. The rotating reflectors 54 and 56 are shown in FIG. 1 for example as multifaced pyramidal reflectors having planar reflective surfaces 58. It will be understood that the number of reflective surfaces of the members 14, 54 and 56 may be any integer number including one. The arrangement of the stationary reflectors 50 and 52 is such as to direct the central rays of their respective light beams to the rotating reflective surfaces 58 preferably parallel to the axis of rotation of the means 54 and 56. The angle of the reflective surfaces 58 with respect to their axis of rotation is arranged to cause the respective modulated light beams 42 and 44 to be swept or scanned so as to define or trace a spatial cone.

As shown in FIG. 1, a transport comprising a series of drive and guide rollers 60 is arranged to position and move an optical record medium 62 in cooperative relation with the rotating reflectors 54 and 56. The record medium 62 may for example be, Kodak type 3404 Mylar Base or Kodak Microfile AHU 5460 Acetate Base for an Argon (4,880 A) light source, Kodak type 2496 Mylar Base for a Helium-Neon (6,328 A) light source, or Kodak Panatomic-X for a Xenon-Arc Lamp light source. The foregoing are tradename products available from Eastman Kodak Co., Rochester, New York. The medium 62 is disposed by the transport to have planar portions respectively arranged substantially normal or perpendicular to the axes of rotation of the reflectors 54 and 56. The planar portions 64 and 66 intercept the conically scanned light beams 42 and 44 to form separate series of arcuate scans 68 and 70 on the medium 62 as it is moved. As shown in FIG. 1, the width of the medium 62 and relative spatial relation between the rotating members 54 and 56 are made to facilitate recording both of the scan series 68 and 70 on a common medium. Again all points on a given arc scan locus are substantially equidistant from the axis of rotation of its rotating reflector. Interposed between the rotating reflectors 54 and 56 is a preferably opaque masking or shielding means 72. The means 72 as shown may be arranged to prevent portions of the scanned loci, which are not of interest for a particular application, from intersecting the record medium 62.

While applications may exist for asynchronous rotating operation of the scanning members such as 14, 54, and 56, a preferable mode of operation is one in which all scanner members are driven by known means (not shown) in synchronism.

Figure 2B:
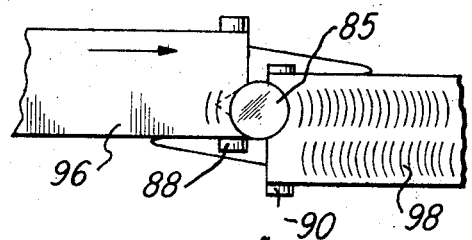

If reference is made to FIG. 2, there is shown an alternative embodiment for the recording light scanner and medium portion of the arrangement of FIG. 1. In FIG. 2, the light beam 80 is modulated, collimated, and focused, by means and in the manner shown and described in regard to FIG. 1. The modulated light beam 80 is directed by a stationary planar reflector 82 to the reflective planar surface 84 of the rotating member 85, which here is shown as a single-faced reflector or mirror 84. The reflector 82 is arranged to direct the central ray of the light beam parallel to and preferably coaxially with the axis of rotation of the member 85. As discussed regarding FIG. 1, suitable masking means, not shown, may be utilized to block certain regions scanned by the light beam 92. As shown in FIG. 2, a record medium 86 is provided and arranged in cooperative relation with the member 85. A medium transport including roller pairs 88 and 90 are arranged to dispose the portions 96 and 98 of the medium 86, intercepted by the conical scan light beam 92, in a plane substantially normal to the axis of rotation of the member 85. However as observed particularly in FIG. 2b, the roller pairs 88 and 90, while having parallel axis of rotation, are offset laterally to opposite sides of the member 85. This arrangement offsets the centerline of the portions 96 and 98 of the medium 86, enabling separate adjacent series of arcuate scans to be recorded on a single medium 86 with a single rotating member 85.

It will be understood that recording with a single rotating member, separate and different information in each of the parallel adjacent arcuate scanned strips or series of FIG. 2 may be accomplished by utilizing separately modulated light beams and combinations of optical elements to direct the separate modulated beams to simultaneously illuminate different reflective surfaces of the rotating member 85.

If reference is made to FIG. 3, there is shown a planar reflector 120 rotatable about its axis 122. A light beam 124 from a source, not shown, is directed through collimating means 126 and focusing means 128 to the reflector 120 preferably with its central ray parallel to its axis of rotation. The angle of reflector 120 with respect to its rotation axis 122 is made to direct the reflected light beam 124 to a stationary reflector 130. The reflector 130 is preferably a concave surface of revolution, and may be for example a section of a sphere, to preserve the conical nature of the scan provided by the rotating reflector 120. A surface, here shown as a record medium 132, is arranged by rollers 134 to have a substantially planar portion 136 below the reflector 130, which portion is substantially normal to the axis of rotation 122 of reflector 120. However the substantially planar surface 136 in practice may be such as the surface 2 of FIG. 1 which is to be examined from a distance. The placement and curvature of the reflector 130 causes the light beam 124 from the reflector 120 to be redirected in a selected direction with respect to the axis 122 and surface portion 136. For example as shown in FIG. 3, the redirected direction is substantially normal to the surface portion 136.

FIG. 3 illustrates the redirection of the laser beam so as to produce a conical scan of a small cone half angle. The cone half angle is the angle between the axis of rotation and an element of the cone of central ray input. Ignoring for simplicity in the following discussion, the possibility of intensity variation due to polarizing effects, the absorption of energy by a receiving medium is a function of the angle of incidence between the incoming beam and the medium surface. Typically, the absorption energy is greatest for a beam which is incident normally, or near normal, to the receiving surface. Although deviations from normal incidence results in diminished absorption, the diminution is typically only a few percent over a range up to 30° or 40° from normal incidence. For photographic film, as an example, less than 2 percent change of absorbed energy is realized from 0° to 40° from normal incidence. At larger angular deviation, the decreased energy absorption is more significant. Using the film example again, a diminution of about 6 percent is experienced at 60° from the normal, and a decrease of about 36 percent is experienced at 80° from the normal. While for many applications, the oblique incidence shown in FIGS. 1 and 2 is fully effective, there may be other cases in which a normal or near normal incidence is desired. In situations where prerecorded optical data is to be scanned and the readout is to be accomplished by sensing of the transmitted beam energy, it may also be desirable to employ a normal or near normal beam incidence, so as to minimize the path length through the data medium itself. The interposed reflector comprising a surface of revolution is the basic element for redirecting the incident beam and reducing the cone half angle. It will be understood that there may be other optical elements of standard form, which a designer may want to include either between the light source and the rotating mirror or anywhere in the optical path, for purposes of spot shaping and sizing. However, as these additional optical components, if desired would be peculiar to specific spot sizes, specific wavelengths, and other unique parameters of a given system, for clarity they are not shown in the figures.

It is important that subsequent to data recording it is possible to replay and retrieve the recorded information. With the use of photographic film as the recording medium, for example, retrieval difficulty may be encountered due to the shrinkage of the emulsion or of the film base itself that results from the chemical development process. With the use of polyester base materials, the emulsion and other gelatin layers experience a shrinkage during processing which may amount to 0.02 percent of the original size. With the use of triacetate base materials, the shrinkage is considerably greater, approximately 0.1 percent, as there is a removal of residual solvents in the triacetate base material itself. In recording systems which are transversely scanned, the only method available for shrinkage compensation is that of local heating of the film base. The configuration described in FIG. 3, illustrates a technique whereby the conical scanning arrangement incorporates means for redirecting light toward the film in a direction which is substantially normal to the film plane or non-normal but at a steep angle of incidence to the film plane. Where the redirection takes the form of a non-normal incidence circular arc scans of various diameters can be produced. Consider a particular example: (a) for a scan arc diameter originally equal to 2.828 inches, and with the use of polyester base film, the diameter change due to shrinkage would be equal to 0.566 mil or 0.000566 inches; (b) for a cone half angle of 10°, the change of diameter of 0.000566 inches corresponds to a height change of approximately 0.003 inches. Adjusting the height of the film plane by the appropriate amount, which is several mils, would result in the variation of the scan diameter sufficient to compensate for process shrinkage. If focus is determined prior to the interception of the beam by the rotating mirror, then the compensation can also be achieved by direct external change of focus so that film plane distance can be adjusted beyond the limits represented by the focal tolerance associated with a specific spot size and energy distribution (Gausian or Airy disc). It should be noted that the example given was for the polyester base film which has a relatively small shrinkage. If a system were to employ the triacetate base, then the shrinkage illustrated would be approximately five times greater. Whether a compensation for size change is most appropriately accomplished by variation of the effective altitude of the film relative to the scanner, or by a change of altitude combined with a matching change of the focal distances of the optical system, the interposition of the non-rotating reflector shown in FIG. 3 provides a sensitive variable control to compensate for circle diameter change. Effectively a change of cone angle is produced by the interposed reflector. Adjustment is more sensitive to altitude change when the cone angle is large. Similarly, a finer adjustment can be made when the cone angle is small, as a greater travel in altitude or focus length is appropriate to the adjustment for diameter change. When the system requirements would indicate the use of a conical scanner having a relatively narrow cone half angle, it may be quite appropriate to employ the interposed reflector as shown in FIG. 3, since a direct conical scan system of narrow cone half angle would require an excessively long focal path between the rotating reflector and the record medium.

For purposes of illustration as shown in the plan and end views of FIG. 4a and b, a typical conical scan recording system might employ a high speed scanner 140 which is 2 ¼ inches in diameter having a four faced pyramidal mirror face 142. The mirror 142 may scan a photographic film 144, 5 inches wide covering distance A which is 4 ½ inches of the width of the film, with an effective quadrant of circular arc scan 143. Rotating at approximately 81,000 rpm, the scanner 140 would sweep the film 144 which would be moving at 3.5 inches per second in the direction of arrow 146. For example the rotating mirror 140 is spaced a distance B of approximately 2 inches, above the plane of the film 144. The pyramidal mirrors would have an included face angle C of 125° (angle between the mirror surface and rotation axis being 62.5°), producing a cone half angle D of the beam incident on the film of 55°. As shown the cone half angle D is the angle between the axis of rotation and an element of the cone of central ray input. Employing an Argon laser source (0.488 $\mu$m), a spot size of 9.5 $\mu$m could be produced by the focusing optics. For the described quadrant of conical scan, the circular arc 143 generated on the film 144 would have a chord A of 4 ½ inches corresponding to a circle diameter of 6.36 inches. The incident light could have as its source, an argon laser whose intensity is modulated according to information received from sensors such as 18 and 20 of the geometrically similar scanning device of FIG. 1. It will be noted that to preserve geometric consistency, the preferably approach would scale the recording equipment geometry with that of the geometry of the scanner which is used to illuminate the information bearing surface. For data recorders, scan spacing would be such as to avoid edge overlap. For image recorders, overlap may be desired. Edge overlap, if present, can be compensated by beam intensity modulation.

While the drawing depicts the use of the invention with a planar scanned surface and record medium, it follows that the scanned surface and/or the record medium could be as well of spherical form, for example, the earth's surface as discussed above. The conical scanning beam generated according to the invention will upon interception with such a surface or medium provide the desired arcuate scan path.

What is claimed is:

1. Light beam scanning apparatus for transducing information with a longitudinally driven moveable record medium, comprising; planar reflecting means rotatable about an axis which forms a given angle with the plane of said reflecting means, means for disposing first and second surface portions on the same side of said record medium in a plane substantially normal to said axis of rotation of said reflecting means, and in cooperative relation therewith, means for illuminating said reflecting means in substantially an axial direction to provide a redirected light beam from said reflecting means which is swept in conical manner when said reflecting means is rotated, and means for positioning said first and second record medium portions to laterally opposite sides of said rotational axis with each of said portions intercepting said light beam to provide separate series of arcuate scans at said first and second portions of said record medium.

2. Apparatus utilizing a light beam for scanning an information bearing surface and recording said information on a moveable record medium, comprising: first scanning means having an axis of rotation substantially normal to said information surface and a rotatable planar reflector at a given angle with respect to said rotational axis, said rotatable reflecting means being responsive to the illumination thereof by a first light beam in the direction of said rotational axis to scan said beam in conical manner to cause arcuate portions of said surface to be illuminated, means for transducing light from said illuminated surface portions to a corresponding electrical signal, light beam modulating means operable to modulate a second light beam in accordance with said electrical signal applied thereto, second scanning means having an axis of rotation with a planar reflector at a given angle with respect to the rotational axis of said second scanning means, means for disposing at least a portion of said record medium in cooperative spaced relation with said second scanning means and substantially normal to its axis of rotation, and means for illuminating with said modulated light beam the planar reflector of said second scanning means substantially in its axial direction causing said modulated beam to be scanned in a conical manner illuminating arcuate portions of said record medium when said second scanning means is rotated.

3. In a recorder-reproducer system including apparatus for scanning a light beam to transduce information with a surface of a record medium wherein said record medium is subject to shrinkage which alters the dimensions of said scanned surface, the combination comprising; planar reflecting means rotatable about a given axis and relatively movable between first and second positions with respect to said record medium along said axis with the plane of said reflecting means forming a given fixed angle with respect to said rotation axis, means for disposing at least the portion of said surface of said record medium to be scanned in a plane substantially normal to the axis of rotation of said reflecting means, said given angle of said reflecting means being such that the redirect beam from said reflecting means is scanned in a conical manner to provide an arcuate path of given curvature across said surface when said reflecting means is rotated, whereby the given curvature of said arcuate path is determined in accordance with the one of said first and second positions occupied by said planar reflecting means.

* * * * *